United States Patent
Dzmitrenka et al.

(10) Patent No.: US 8,892,692 B2
(45) Date of Patent: *Nov. 18, 2014

(54) SYSTEM AND METHOD FOR CONSUMER-TO-CONSUMER LENDING OF DIGITAL CONTENT

(75) Inventors: Aliaksei Dzmitrenka, New York, NY (US); Alexandra Taylor, New York, NY (US); Angela Pablo, New York, NY (US); David Bock, New York, NY (US); David Mandelbaum, New York, NY (US); Douglas Gottlieb, Douglaston, NY (US); Kai Wang, New York, NY (US); LaToya Adams, New York, NY (US); Michael Yoon, Astoria, NY (US); Sudeep Narain, New York, NY (US); Ulrich Palha, New York, NY (US); Victoria Repice, New York, NY (US); Theresa Horner, New York, NY (US)

(73) Assignee: barnesandnoble.com llc, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/154,350

(22) Filed: Jun. 6, 2011
(Under 37 CFR 1.47)

(65) Prior Publication Data
US 2012/0239758 A1 Sep. 20, 2012

Related U.S. Application Data

(63) Continuation of application No. 12/907,960, filed on Oct. 19, 2010, now abandoned.

(60) Provisional application No. 61/253,037, filed on Oct. 19, 2009.

(51) Int. Cl.
*G06F 15/16* (2006.01)
*G06F 21/10* (2013.01)

(52) U.S. Cl.
CPC .................................... *G06F 21/10* (2013.01)
USPC ....................................................... 709/219

(58) Field of Classification Search
USPC ........... 709/217, 219; 726/26–33; 705/54, 57, 705/59
See application file for complete search history.

(56) References Cited

U.S. PATENT DOCUMENTS

| 4,855,725 A | 8/1989 | Fernandez |
| 4,899,299 A | 2/1990 | MacPhail |

(Continued)

FOREIGN PATENT DOCUMENTS

| JP | 09147029 A | 6/1997 |
| JP | 11039263 A | 2/1999 |

(Continued)

OTHER PUBLICATIONS

Web Article, Hugo Hallman, "Rationalizing access checks with HMAC:ed URLs,", Oct. 16, 2004, p. 1-6.

*Primary Examiner* — Derrick Ferris
*Assistant Examiner* — Scott M Sciacca
(74) *Attorney, Agent, or Firm* — Winston & Strawn LLP (57) ABSTRACT

A consumer-to-consumer lending system and method for digital content such as digital ebooks. The lending system invention enables a user who has purchased digital content to lend that content to another user. The lending system enables a lender to extend a lending offer to a lendee and a lendee to respond to the lending offer. A lendee may accept or reject a lending offer. Upon acceptance, the lending system provides the lent content to the lendee who controls the content until returning it, purchasing it or until a predetermined lending period expires. During the lending period the lender does not have access to the lent digital content item. The lending system assists a lender with initiating a lending offer, such as providing a pre-populated email form, and delivers the lend offer notification to the target lendee. Lending offers may be initiated and notifications received over common channels, including email systems, mobile devices, and web-based user accounts. The lending process can be initiated directly from a consumer device.

18 Claims, 8 Drawing Sheets

(56) References Cited

U.S. PATENT DOCUMENTS

| | | | |
|---|---|---|---|
| 4,924,378 A | 5/1990 | Hershey et al. | |
| 5,014,234 A | 5/1991 | Edwards, Jr. | |
| 5,109,413 A | 4/1992 | Comerford et al. | |
| 5,457,746 A | 10/1995 | Dolphin | |
| 5,598,470 A | 1/1997 | Cooper et al. | |
| 5,734,891 A | 3/1998 | Saigh | |
| 5,764,972 A | 6/1998 | Crouse et al. | |
| 6,901,386 B1 | 5/2005 | Dedrick et al. | |
| 7,054,840 B1 | 5/2006 | Foth et al. | |
| 7,200,575 B2 | 4/2007 | Hans et al. | |
| 7,231,370 B1 | 6/2007 | Kapur | |
| 7,299,498 B2 | 11/2007 | Lee et al. | |
| 7,299,501 B2 | 11/2007 | Hendricks | |
| 7,814,025 B2 * | 10/2010 | Roever et al. | 705/65 |
| 7,917,965 B2 * | 3/2011 | Manning et al. | 726/31 |
| 8,364,595 B1 | 1/2013 | Ringewald | |
| 8,627,500 B2 | 1/2014 | Rogel et al. | |
| 2002/0019943 A1 * | 2/2002 | Cho et al. | 713/200 |
| 2002/0026445 A1 | 2/2002 | Chica et al. | |
| 2002/0083178 A1 * | 6/2002 | Brothers | 709/226 |
| 2002/0152173 A1 | 10/2002 | Rudd | |
| 2003/0004885 A1 * | 1/2003 | Banerjee et al. | 705/52 |
| 2003/0078888 A1 | 4/2003 | Lee et al. | |
| 2004/0199471 A1 | 10/2004 | Hardjono | |
| 2005/0137984 A1 * | 6/2005 | Nguyen et al. | 705/51 |
| 2005/0219664 A1 | 10/2005 | Niwa | |
| 2006/0036548 A1 | 2/2006 | Roever et al. | |
| 2006/0143134 A1 | 6/2006 | So et al. | |
| 2006/0253398 A1 * | 11/2006 | Kim et al. | 705/50 |
| 2007/0112676 A1 * | 5/2007 | Kontio et al. | 705/50 |
| 2007/0219917 A1 | 9/2007 | Liu et al. | |
| 2007/0265977 A1 * | 11/2007 | Read | 705/59 |
| 2007/0283420 A1 * | 12/2007 | Rantalahti | 726/4 |
| 2008/0114729 A1 | 5/2008 | Raman et al. | |
| 2008/0148069 A1 * | 6/2008 | Tsuria et al. | 713/193 |
| 2008/0178001 A1 | 7/2008 | Kim et al. | |
| 2009/0049556 A1 * | 2/2009 | Vrielink et al. | 726/26 |
| 2009/0165124 A1 * | 6/2009 | Spektor | 726/21 |
| 2009/0216623 A1 | 8/2009 | Hendricks et al. | |
| 2009/0228395 A1 * | 9/2009 | Wegner et al. | 705/59 |
| 2009/0260067 A1 | 10/2009 | Racabi | |
| 2009/0281953 A1 | 11/2009 | Ruskowski | |
| 2010/0067705 A1 | 3/2010 | Boccon-Gibod et al. | |
| 2010/0106659 A1 * | 4/2010 | Stefik et al. | 705/310 |
| 2010/0191770 A1 | 7/2010 | Cho et al. | |
| 2010/0262515 A1 * | 10/2010 | Brewer | 705/27 |
| 2010/0322373 A1 | 12/2010 | Churilla | |
| 2011/0016182 A1 * | 1/2011 | Harris | 709/206 |
| 2011/0143650 A1 | 6/2011 | Robinson | |
| 2012/0090019 A1 * | 4/2012 | Messerges et al. | 726/4 |
| 2012/0179753 A1 | 7/2012 | Welingkar et al. | |

FOREIGN PATENT DOCUMENTS

| | | |
|---|---|---|
| JP | 2002189958 A | 7/2002 |
| JP | 2002259739 A | 9/2002 |
| JP | 2003186751 A | 7/2003 |
| JP | 2003186982 A | 7/2003 |
| JP | 2005316990 A | 11/2005 |
| JP | 2006134348 A | 5/2006 |
| JP | 2006522413 A | 9/2006 |
| JP | 200852663 A | 3/2008 |
| WO | WO93/01550 A1 | 1/1993 |
| WO | WO93/09490 A1 | 5/1993 |
| WO | WO2004/093062 A2 | 10/2004 |

* cited by examiner

SYSTEM AND METHOD FOR CONSUMER-TO-CONSUMER LENDING OF DIGITAL CONTENT

CROSS REFERENCE TO RELATED APPLICATIONS

This application is a continuation of U.S. patent application Ser. No. 12/907,960, filed Oct. 19, 2010, which claims priority to U.S. Provisional Application No. 61/253,037, filed on Oct. 19, 2009, the entirety of which is incorporated herein by reference.

FIELD OF THE INVENTION

This invention relates to digital content distribution and, in particular, to a consumer-to-consumer lending system for electronic books (ebook).

BACKGROUND OF THE INVENTION

Publishers have legitimate business and legal concerns regarding digital content lending systems. Unlike paper copies of their book content, copies of digital content are relatively easy to make and very easy to distribute. To meet business concerns, publishers require that a lending system ensures that only one user at a time has access to the ebook content purchased by a user. To meet legal concerns, publishers require that a lending system does not permit the duplication of multiple copies of ebook content in violation of copyright law. These business and legal concerns present a technical problem to which there is currently no technical solution.

There are library-based lending systems in use that allow an ebook to be lent from a library to a patron of the library (see for example the ebook lending system at the New York Public Library (ebooks.nypl.org)). A library-based lending system is not a consumer-to-consumer lending system and differs in several significant regards. In a library lending system, a library patron submits a request to the library for a book contained in the library. The requests for books are always between patrons and the library system itself. There is no lending between patrons of the library system. Current library-based lending systems do not have the technical capability to facilitate a lending process directly between one user and another user.

U.S. Pat. No. 6,901,386 describes a system by which corporations or other entities can manage their licenses to electronic assets, e.g. software. As is well known, software licenses, particularly licenses to enterprise software, can be very expensive. Corporations are therefore always looking for ways to maximize the use of their licenses across the organization. In the system described in this patent, the owner of a current license to an electronic asset "releases" its license to the license management system. This released license can be re-assigned other users in the organization.

U.S. Pat. No. 7,054,840 describes a clearinghouse for rights in digital material. If a user decides to sell or otherwise transfer her rights to some digital material, she transfers her rights to a clearinghouse server which posts the digital material as being for sale or other transfer. When a buyer or borrower sees the posting, he can buy or borrow the material through the clearinghouse.

U.S. Patent Publication US 2006/10543134 describes a licensing system in which a request for a license is received either directly from a borrower or indirectly through a licensing authority.

None of these systems of the prior art describe a consumer to consumer lending system that provides the technical safeguards required by authors and publishers to ensure unauthorized copies are not made.

SUMMARY OF THE INVENTION

The present invention is a consumer-to-consumer lending system for digital content. More specifically, the present invention is a lending system for digital ebooks, but can be used to facilitate lending of other digital content such as audio books, movies, music or software. The lending system invention enables a user who has purchased digital content to lend that content to another user. The lending system enables a lender to extend a lending offer to a lendee and a lendee to respond to the lending offer. A lendee may accept or reject a lending offer. Upon acceptance, the lending system provides the lent content to the lendee who controls the content until returning it or until a predetermined lending period expires. The lending system assists a lender with initiating a lending offer, such as providing a pre-populated email form, and delivers the lend offer notification to the target lendee. Lending offers may be initiated and notifications received over common channels, including email systems, mobile devices, and web-based user accounts. The present invention has the ability to initiate the lending process directly from a consumer device.

The lending system of the present invention provides a technical solution to the technical problem of applying digital rights management (DRM) techniques to control and support the expiration of lent content. When a lendee rejects or blocks an electronic lending offer, the lending system returns control of the digital content to the lender. Similarly, when an electronic lending offer expires or the lending period for the lent content ends, the lending system returns control of the digital content to the lender.

The lending system also electronically manages the conditions for lending each digital content item within the system. For example, not all owners of digital content may provide the authorization for their digital content to be lent. Another owner of a particular digital content item may only let its digital content be lent by a lender once. Most owners of digital content allow only one user at a time to access its digital content. Therefore, for most digital content items, the system of the present invention prevents a lender from using content lent to a lendee during the lending period. In this preferred embodiment, only the lendee can use the lent content during the lending period. The lending system can allow some properties of digital content to be configurable in support of changing business needs, while other properties must be fixed in support of owner/publisher restrictions and statutory requirements. For example, the duration of a lending period may be configurable to tie in with marketing promotions while copying digital content may be prohibited to adhere to copyright laws.

As appreciated by those skilled in the art, the consumer-to-consumer lending system and method of the present invention can apply not only to ebooks, but also to any digital content, such as digital movies, digital music, digital audio books, digital pictures, or other downloadable digital content.

In a first aspect of the present invention, the method is operated on a lending server for controlling the lending of a digital content item from a lender to a lendee. The lending server first receives a lending offer from the lender of the digital content item. The lending offer identifying at least the digital content item to be loaned and identifying the lendee. The lending server generates a lending notice identifying at least the digital content item and transmits the lending notice to the lendee. The lending server receives an acceptance or rejection of the lending offer from lendee. If the lendee has accepted the lending offer, the lending server provides the lendee with access to the digital content item and prevents access by the lender to the digital content item.

In a preferred embodiment, a browser-based interface is provided for the lender and the lendee to interface with the lending server. Additionally, a non-browser-based interface is also provided for the lender and the lendee to interface with the lending server. A notice is provided to the lendee on an electronic device of the lendee that is registered with the lending server. In a further aspect, an email is generated and transmitted to the lendee letting the lendee know of the lending offer. In a further aspect, a Uniform Resource Locator (URL) is included in the email and the lendee connects to the lending server using the URL. IN this aspect, the URL contains parameters including a combination of a lending offer ID and an encrypted security hash code. The server verifies that the parameters contained in the URL used by the lendee matches an existing, valid, unexpired lending offer.

In a further aspect, the server prevents access by the lender to the digital content item after the lending notice has been transmitted. In this further aspect, a copy of the digital content item is stored on an electronic device of the lender. The server prevents access by the lender to the digital content item by removing the digital content item from the lender's electronic device. Each of the lender and the lendee can have electronic devices by which they access the lending server. In this aspect, the electronic devices are synchronized with the lending server.

In a further aspect, the server provides the lendee with access to the digital content item by transmitting a copy of the digital content item from the server to an electronic device of the lendee. In this aspect, the copy of the digital content item is preferably encrypted before it is transmitted from the server to the electronic device of the lendee.

In a further aspect, an expiration period is set for the lending notice during which the lendee must accept the lending offer. Also, a loan period is set for the loan of the digital content item. After the expiration of the loan period, the lending server prevents access by the lendee to the digital content item and grants access to the digital content item by the lender. In a preferred embodiment, a lender can loan the digital content item a predetermined numbers of times.

In a further aspect, an interface is provided for the lender to view a plurality of digital content items to which the lender has access. In a preferred embodiment, an identification of which of the plurality of digital content items are capable of being loaned is provided.

A system of the present invention for controlling the lending of a digital content item from a lender to a lendee includes a lending server that operable to receive a lending offer from the lender of the digital content item. The lending offer identifies at least the digital content item to be loaned and identifies the lendee. The server generates a lending notice identifying at least the digital content item and transmits the lending notice to the lendee. The server further receives an acceptance or rejection of the lending offer from lendee. If the lendee has accepted the lending offer, the server provides the lendee with access to the digital content item and prevents access by the lender to the digital content item.

In an aspect of a system of the present invention there is a customer account database that stores information related to accounts that the lender and lendee have with the lending server. A lending offer database stores information related to the lending offer including the acceptance or rejection of the lending offer. A digital locker database stores information related to the digital content item. Customer data software uses the customer account database, the lending offer database and the digital locker database to validate the lending offer, create the lending notice, and mark the digital content item as lent in a lender's digital locker in the digital locker database.

In a further aspect of a system of the present invention, a digital content file database stores the digital content item. Content control software encrypts the digital content items.

Another aspect of a system of the present invention includes a user interface for communicating with the lender and the lendee. The user interface receives a lending offer from the lender of the digital content item. The lending offer identifies at least the digital content item to be loaned and identifying the lendee. A customer account database stores information related to accounts that the lender and the lendee have with the system. A lending offer database stores information related to the lending offer. A digital locker database stores information related to the digital content item. Customer data software uses the customer account database, the lending offer database and the digital locker database to validate the lending offer, create a lending notice to the lendee, and mark the digital content item as lent in a lender's digital locker in the digital locker database. A digital content file database stores the digital content item. Content control software encrypts the digital content item.

In another aspect of a system of the present invention includes a lender electronic device. The lender electronic device generates a lending offer identifying at least the digital content item to be loaned and identifying the lendee. A lending server receives the lending offer from the lender, generates a lending notice identifying at least the digital content item to be loaned and transmits the lending notice to the lendee. A lendee electronic device receives the lending offer, generating an acceptance or rejection of the lending offer and transmits the acceptance or rejection to the lending server. If the lendee has accepted the lending offer, the lending server provides the lendee with access to the digital content item and prevents access by the lender to the digital content item.

BRIEF DESCRIPTION OF THE DRAWINGS

For the purposes of illustrating the present invention, there is shown in the drawings a form which is presently preferred, it being understood, however, that the invention is not limited to the precise form shown by the drawing in which.

DETAILED DESCRIPTION OF THE INVENTION

Figure 1:
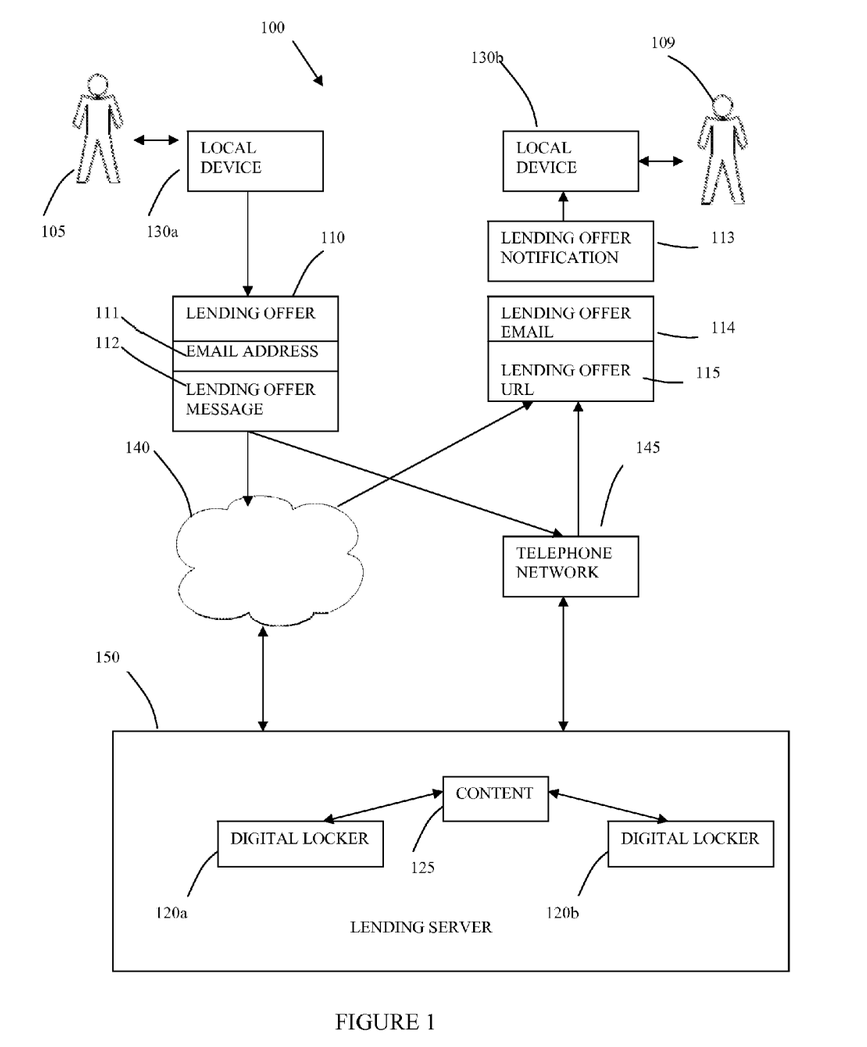
FIG. 1 shows a conceptual block diagram representation of an embodiment of a consumer-to-consumer lending system and method of the present invention.

FIG. 1 shows components of lending system 100 according to the present invention. Lender 105 is an authorized user of lending system 100. Many of the functions of lending system 100 of the present invention are carried out on lending server 150. As appreciated by those skilled in the art, many of the functions described herein can be divided between the lending server 150 and the user's local device 130a. Further, as also appreciated by those skilled in the art, lending server 150 can actually be comprised of several servers performing interconnected and distributed functions. The lender 105 can connect to the lending server 150 via the Internet 140, a telephone network 145 (e.g., a cellphone network) or other suitable electronic communication means. Lender 105 has an account on lending server 150, which authorizes lender 105 to use lending system 100.

Associated with the lender's 105 account, is the lender's 105 digital locker 120a located on the lending server 150. As further described below, in the preferred embodiment, digital locker 120a contains links to copies of digital content 125 previously purchased by lender 105. Some of the digital content 125 purchased by lender 105 is digital content 125 with lending rights. For the digital content 125 with lending rights, lender 105 is allowed to lend lender's 105 copy of digital content 125 to another authorized user of lending system 100.

Indicia of rights to all copies of digital content 125 owned by lender 105, including digital content 125, is stored by reference in digital locker 120a. Digital locker 120a is a remote online repository that is uniquely associated with the lender's 105 account. As appreciated by those skilled in the art, the actual copies of the digital content 125 are not necessarily stored in the user's locker 120a, but rather the locker 120a stores an indication of the rights of the user to the particular content 125 and a link or other reference to the actual digital content 125. Typically, the actual copy of the digital content 125 is stored in another mass storage (not shown). The digital lockers 120 of all of the lenders 105 who have purchased a copy of a particular digital content 125 would point to this copy in mass storage. Of course, back up copies of all digital content 125 are maintained for disaster recovery purposes. Although only one example of digital content 125 is illustrated in this figure, it is appreciated that the lending server can contain millions of files 125 containing digital content. It is also contemplated that the lending server 150 can actually be comprised of several servers with access to a plurality of storage devices containing digital content 125. As further appreciated by those skilled in the art, in conventional licensing programs, the user does not own the actual copy of the digital content, but has a license to use it. Hereinafter, if reference is made to "owning" the digital content, it is understood what is meant is the license or right to use the content.

Lender 105 can access his or her digital locker 120a using a local device 130a. Local device 130a is an electronic device such as a personal computer, an e-book reader, a smart phone or other electronic device that the lender 105 can use to access the lending server 150. In a preferred embodiment, the local device has been previously associated (registered) with the lender's 105 account using lender's 105 account credentials. Local device 130a provides the capability for lender 105 to download lender's 105 copy of digital content 125 via his or her digital locker 120a. After digital content 125 is downloaded to local device 130a, lender 105 can engage with the downloaded content locally—e.g., read the book, listen to the music, watch the video.

In a preferred embodiment, local device 130a includes a non-browser based device lending interface that allows lender 105 to initiate the lending of digital content 125 to another authorized user of lending system 100 in a non-browser environment. Through the device lending interface, the lender 105 is automatically connected to the lending server 150 in a non-browser based environment. This connection to the lending server is a secure interface and can be through the telephone network 145, typically a cellular network for mobile devices. If lender 105 is accessing his or her digital locker 120 using the Internet 140, local device 130a also includes a web account interface. Web account interface provides lender 105 with browser-based access to his or her account and digital locker 120 over the Internet 140. The web account interface also includes web lending interface similar to the device lending interface of the non-browser embodiment. Web lending interface allows lender 105 to initiate the lending of digital content 125 to another authorized user of lending system 100 in a browser based environment.

Lendee 109 is also an authorized user of lending system 100. As with lender 105, lendee 109 has account with lending server 150, which authorizes lendee 109 to use lending system 100. Lendee 109 can be the recipient of a loaned copy of digital content 125 from lender 105. Indicia of rights to digital content 125 that is lent to lendee 109 and indicia of rights to any other copies of digital content owned by lendee 109 are stored by reference in her digital locker 120b. As with lender 105, lendee 109 can access his or her digital locker 120b using her local device 130b. In a preferred embodiment, local device 130b is a device that lendee 109 has previously associated (registered) with his or her account using lendee's 109 account credentials. Local device 130b allows lendee 109 to download a copy of loaned digital content 125 from digital locker 120b once the copy of digital content 125 is successfully lent from lender 105. Lendee 109 can engage with downloaded lent digital content 125 locally on local device 130b. Local device 130b also includes a device lending interface. Device lending interface allows lendee 109 to respond to lending offer notifications.

Lendee 109 can also access his or her digital locker 120b using a browser based web account interface. Web account interface provides lendee 109 with browser-based access to his or her account and digital locker 120b over the Internet 140. Web account interface also provides lendee 109 with access to web lending interface. Web lending interface allows lendee 109 to respond to lending offer emails.

Lender 105 initiates an electronic lending offer 110 to lend digital content 125 to lendee 109. As further described below, when processed by the lending server 150, a lending offer 110 initiated by lender 105 is linked to the digital content 125 to be loaned and linked to lender 105 via his digital locker 120a. The lending offer 110 may include informational details about the loaned content 125 and lender 105, such as the title of the item 125 and the name of lender 105. Lending offer 110 preferably includes an email address 111 of lendee 109 and a lending offer message 112. The email address 111 is an unconfirmed email address of lendee 109 that is entered by lender 105. Lending offer message 112 contains content (e.g., lendee's 109 email address) that is used to communicate the lending offer 110 to lendee 109. Lending offer message 112 may also include optional message content entered by lender 105 (e.g., "Hi, I think you'll like this book").

In the non-browser embodiment, email address 111 is used by the lending server 150 to identify the lendee 109 in order to deliver a lending offer notification 113 to lendee 109 on local device 130b. This lending offer notification 113 will be received by the lendee 109 the next time she logs onto her account on the lending server 150. Email address 111 is also used to deliver lending offer email 114 directly to lendee's 109 email account. Lending offer notification 113 is an alert delivered by lending system 150 to lendee 109 which lendee 109 receives and can respond to using device lending interface in his or her local device 130b. Lending offer email 114 is an email delivered to email address 111 that lendee 109 receives via his or her email system. Lending offer email 114 contains a lending offer Uniform Resource Locator (URL). Lending offer URL 115 contains a combination of a lending offer ID and an encrypted security hash code. This combination of parameters in the lending offer URL is used to verify that an incoming request to respond to lending offer 110 over the Internet 140 matches an existing, valid, unexpired lending offer 110. This feature provides security for intentional or unintentional hacking of the system and prevents unauthorized access to digital content 125.

Lending server 150 manages the receipt of the lending offer 110 from lender 105 and initiates the generation and delivery of lending offer notification 113, and lending offer email 114 to lendee 109. As further described below, Lending server 150 is also capable of receiving lending offers 110 from lender 105 that are intended for a proposed lendee that is not already an authorized user of the system (i.e. proposed lendee does not have an account established on lending server 150). In this embodiment of the present invention, lending server 150 only sends the lending offer email 114 to the proposed lendee. In order to accept the lending offer, the proposed lendee must log onto the system and register with the lending system and thus become an authorized lendee 109.

Figure 2:
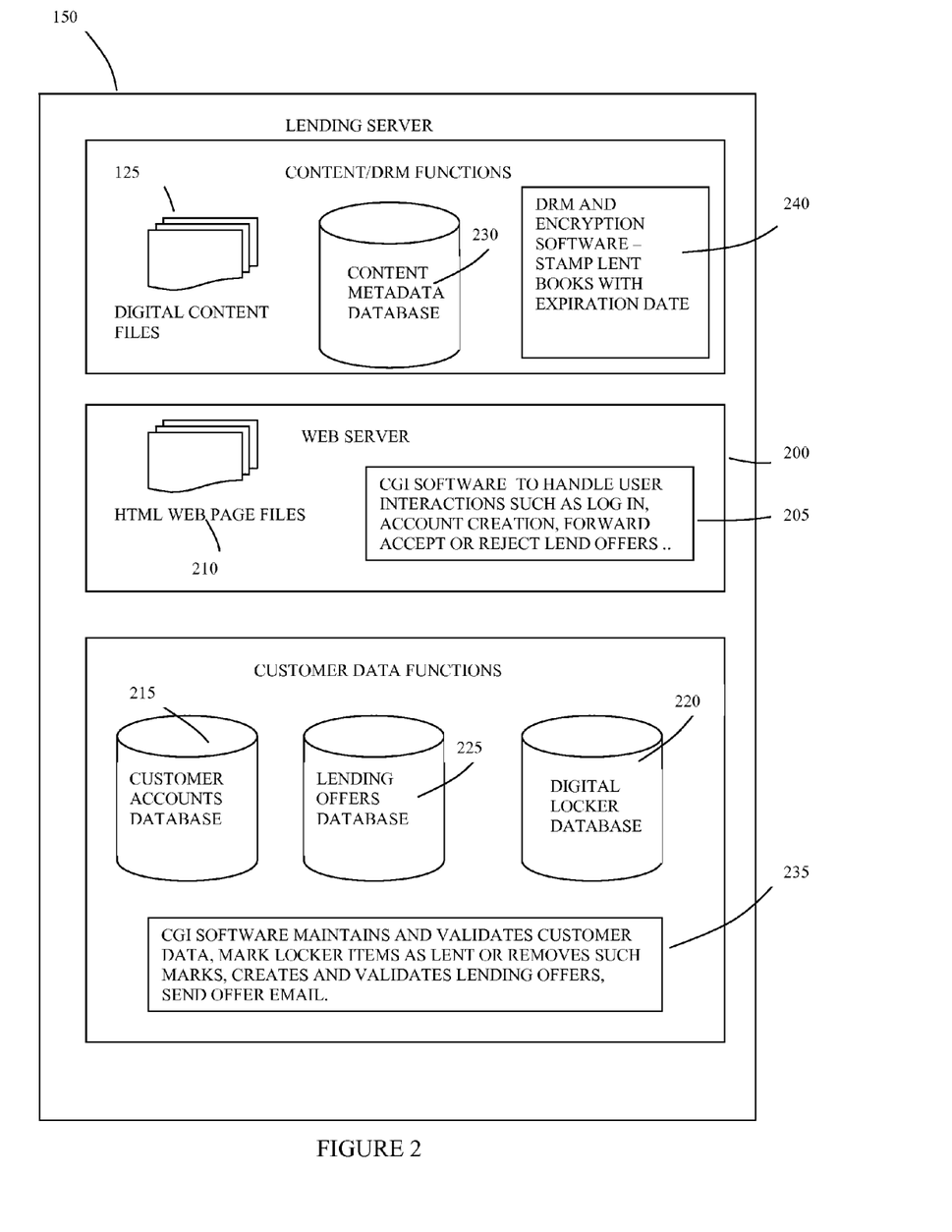
FIG. 2 illustrates component parts of the lending server of a consumer-to-consumer lending system of the present invention.

FIG. 2 illustrates a block diagram of the detailed components of lending server 150 in lending system 100. Lending server 150 handles front-end functions related to web server operations and user interactions with web and device lending interfaces in connection with the user's local devices 130. Lending server 150 also handles all backend functions of lending system 100 related to managing accounts, tracking lending offers, maintaining digital locker records, maintaining content metadata and lending rights, and providing encryption and expiration services.

Lending server 150 provides both the browser based web lending interface and non browser based device lending interface. Lender 105 may engage with web lending interface or device lending interface to initiate lending offer 110. Lending server 150 uses web lending interface as a way to present lending offer 110 to lendee 109 over the Internet 140. Lending server 150 uses the device lending interface as a way to present lending offer notification 113 directly to lendee 109 on local device 130b. Lendee 109 may engage with web lending interface or device lending interface to accept or reject lending offer 110. Lendee 109 may also engage with web lending interface or device lending interface 106 to return lent digital content 125 prior to the expiration of the lending period of digital content 125.

Lending server 150 provides access to a web account interface for lendee 109. Lendee 109 may log into his or her account in response to receipt of a lending offer email 114 delivered to email address 111. Lending server 150 also provides access to web account interface to a party with email address 111 who receives lending offer email 114, but does not have an account in lending system 100. The party may use web account interface to create an account. Creating the account establishes the party as lendee 109 with an account and a digital locker 120 in lending system 100.

Lending server 150 employs web server 200 including web services interface software 205 to handle interactions between front-end components; such as device lending interface, web account interface, and web lending interface; and back-end database components of lending system 100. Web server 200 services include serving up the web pages 210 that comprise web account interface and web lending interface, and the underlying web services associated with device lending interface. Web services interface software 205 include handling user's logins to their accounts and processing the initiation of and response to lending offer 110.

Back-end database components of lending system 100 include customer accounts database 215, digital lockers database 220, lending offers database 225 and content metadata database 230. Records for users' accounts are stored and managed in customer accounts database 215. Records for digital lockers 120 are stored and managed in digital lockers database 220. Records for lending offers 110 are stored and managed in lending offers database 225. Content metadata database 230 serves as a source of metadata and lending rights information for individual digital content items 125 in lending system 100. Lending rights information in content metadata database 230 indicates whether any particular digital content 125 may be lent.

Web services interface software 205 in the web server 200 interfaces with customer data services 235 to update customer accounts database 215, digital lockers database 220, and lending offers database 225. Customer data services 235 processes database updates such as maintaining and validating customer data in user's accounts, marking and unmarking digital content 125 as lent in digital lockers 120, creating and validating lending offers 110, and sending lending offer notifications 113 and lending offer emails 114.

Web services interface software 205 in the web server 205 also interfaces with content encryption services 240 to secure elements of lending offers 110 and to package digital content 125 for secure delivery to lender 105 and lendee 109. Web services interface software 205 provides an encrypted security hash code as a parameter for lending offer URL as described above. Content encryption services 240 processes digital content 125 to ensure that content 125 is packaged securely for lender 105 as owner and separately packaged securely for lendee 109 when lent.

Web services interface software 205 in the web server 200 further interfaces with Digital Rights Management (DRM) services 240 and lending offers database 235 to manage lending expirations. Web services interface software 205 manages expiration setting, checking, and enforcement for lending offers 110 and the lending period for digital content 125. DRM services 240 stamps an expiration date on digital content 125 when lent to lendee 109.

In the preferred embodiment of the invention, lending system 100 is a consumer-to-consumer ebook lending system. Although the ebook application is the preferred embodiment, as appreciated by those skilled in the art, the lending system 100 of the present invention is not limited to consumer lender 105 lending only an ebook to consumer lendee 109. Lending system 100 can be used for consumer-to-consumer lending of any digital content, such as digital movies, digital music, digital audio books, digital pictures, or other downloadable digital content.

In the preferred embodiment of the invention, local devices 130a and 130b are mobile electronic reader (eReader) devices. The embodiment of the invention is not intended to limit local device 130a or local device 130b to a mobile eReader device. Local device 130a or 130b may be a desktop personal computer or another type of mobile consumer electronic device, such as, for example, a cell phone, a laptop computer, a tablet computer or other such mobile digital device.

Operation

Figure 3:
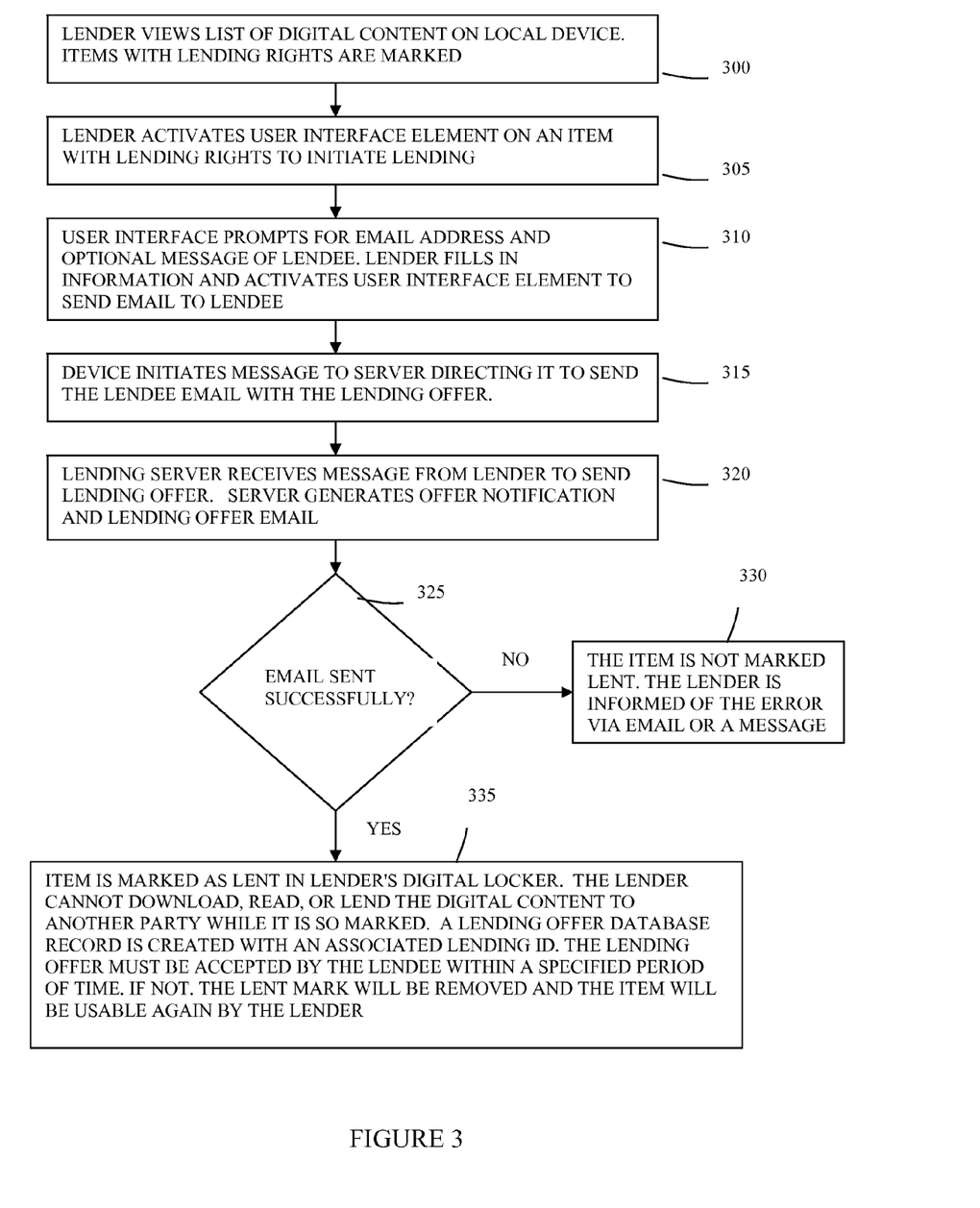
FIG. 3 depicts a flowchart of a method for a consumer-to-consumer lending process where a lender initiates content lending from a mobile device.

FIG. 3 shows an exemplary method for a lender 105 to initiate a lending offer 110 from a mobile device 130a to lend digital content 125. In step 300, lender 105 engages with his or her local device 130a to identify the lender's 105 digital content 125, including digital content 125 that may be lent. In the preferred embodiment, copies of content 125 to which lender 105 has rights are maintained on local device 130a. Alternatively, if the content is not stored on the device 130a itself at the time lender 105 initiates the process, at least information about the content 125, including its lendability is stored on local device 130a. The actual copies of the content 125 can be stored on lending server 150. In another embodiment, the local device 130a can connect to the lending server 150 to view lender's 105 digital content 125.

In step 305, lender 105 invokes device lending interface to initiate a lending offer 110 for the digital content 125 that he or she wants to loan out. In step 310, device lending interface presents lender 105 with a form having certain data entry fields that are pre-populated. Pre-populated fields include information about lender 105 that can be pulled from lender's 105 account in Customer Account Database 215 and information about digital content 125 that can be obtained from Content Metadata Database 230. For example, the email address of lender 105 and the title and author of digital content 125 may be provided. In the data entry fields presented by device lending interface, lender 105 enters lendee's 109 email address 111 and an optional message to lendee 109 that can be included in lending offer message 112. When finished, lender 105 selects a control on device lending interface to send lending offer 110 to lendee 109.

In step 315, lender's device 130a initiates communication, preferably over a wireless network 140 or 145 to direct lending server 150 to process lending offer 110. Lending server 150 generates a lending offer notification 113 and directs it to lendee's 109 local device 130b. In a preferred embodiment, the offer notification is stored in the lendee's digital locker 120b. The lendee 109 is be able to view this notification 113 next time she logs onto her account on lending server 150. Using lendee's 109 email address 111 provided by the lender 105 in the lending offer 110, lending server is able to identify lendee 109 via the Customer Accounts Database 215. Lending server 150 also generates a lending offer email 114, which is sent to lendee's 109 email address 111. In step 325, if lending offer email 114 is not emailed successfully, digital content 125 in digital locker 120a is not marked as lent and lender 105 is informed in step 330 that the lending offer 110 was not successfully sent.

In step 335, if lending offer email 114 is emailed successfully or lending offer notification 113 is delivered successfully, lending server 150 marks digital content 125 in lender's 105 digital locker 120a as lent. Upon synchronization of local device 130a with digital locker 120a, lender 105 cannot download, lend, or otherwise use digital content 125 while digital content 125 is lent. A record in lending offers database 225 for lending offer 110 is created with an associated lending offer ID. The "loaned" digital content 125 is marked as lent, even if the lendee 109 has not yet accepted the lending offer 110. In a preferred embodiment, lendee 109 must accept lending offer 110 within a specified period of time, which CGI software 205 checks and enforces. If lendee 109 does not accept lending offer 110 within a specified period of time, CGI software 205 expires the lending offer 110 and the lent indication on digital content 125 in digital locker 120a is removed. When digital content 125 no longer has a lent indication, lender 105 may use digital content 125.

Figure 4:
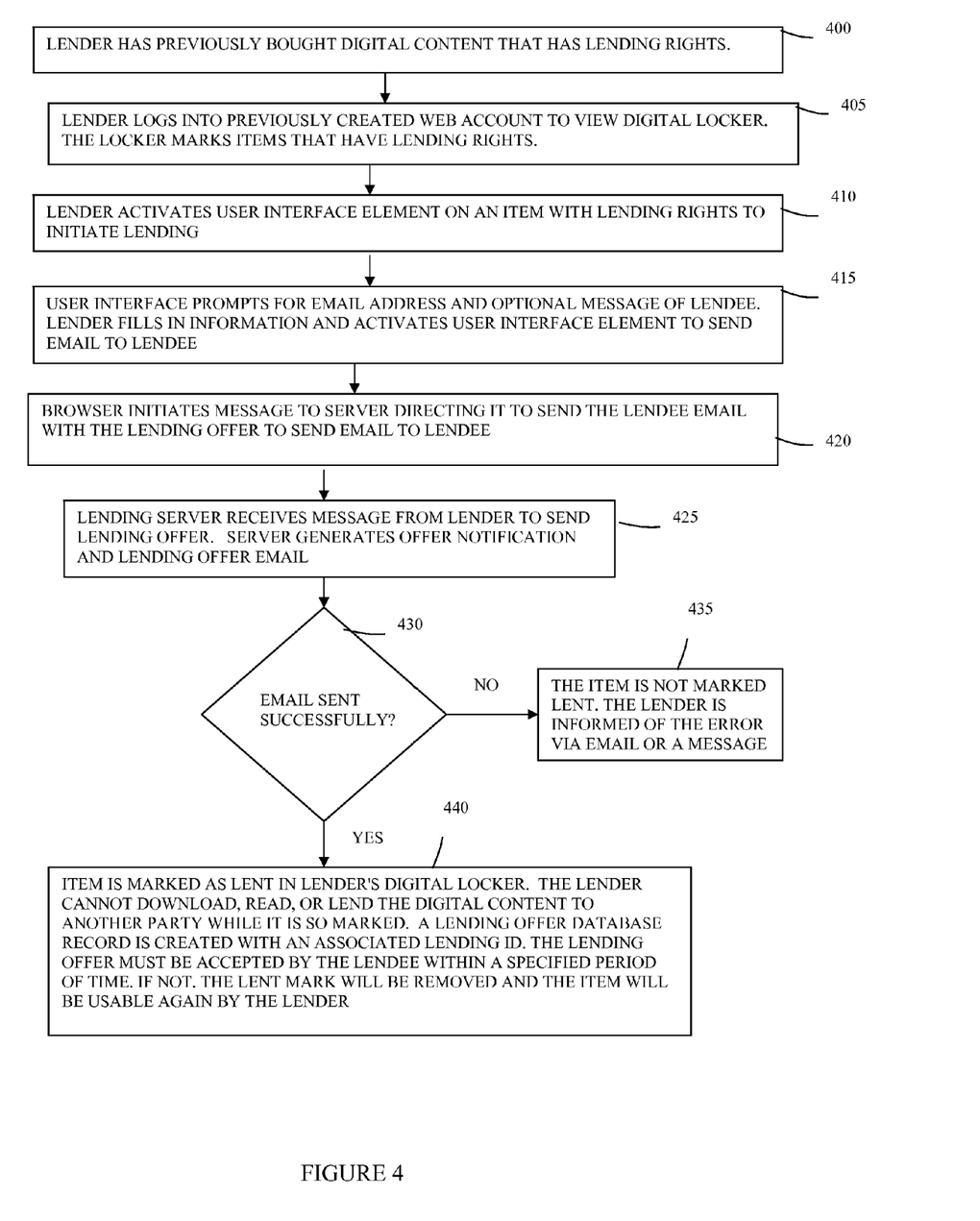
FIG. 4 depicts a flowchart of a method for a consumer-to-consumer lending process where a lender initiates content lending from an account on the web.

FIG. 4 shows an exemplary method 400 for initiating a lending offer 100 using a web browser, where lender 105 initiates lending offer 110 to lend digital content 125 from web enabled interface on his local device 130a. The method illustrated in FIG. 4 for initiating a lending offer using a web enabled interface is similar to the method illustrated in FIG. 3 for initiating a lending offer from an authorized mobile device 130, except lender 105 initiates lending from a web browser in the method described in FIG. 4.

In step 400 it is assumed that lender 105 has previously purchased some digital content 125 that is referenced in her digital locker 120a. In step 405, lender 105 uses web account interface to log into her account on lending server 150. Once logged in, lender 105 can view all of the digital content 125 owned by lender 105 which is referenced in digital locker 120a. Digital locker 120a identifies whether digital content 125 that lender 105 owns may be lent. In step 410, lender 105 invokes web lending interface to initiate a lending offer 110 for digital content 125 that she wishes to lend to lendee 109. In step 415, web lending interface presents a form, similar to that described in FIG. 3, with data entry fields and fields that are pre-populated with information about lender 105 from her account and information about digital content 125 that is proposed to be lent from content metadata database 230. In the data entry fields presented by web lending interface, lender 105 enters lendee's email address 111 and an optional message to include in lending offer message 112. When finished, lender 105 in step 420 selects a control on web lending interface to send lending offer 110 to lendee 109. The web browser underlying web lending interface initiates communication over a network 140, 145 to direct lending server 150 to process the lending offer 110. In step 425 lending server 150 generates lending offer notification 113 and directs it to lendee's 109 local device 130b. Lending server 150 also generates a lending offer email 114 that is sent to lendee's 109 email address 111. If the lending offer email 114 is not emailed successfully, digital content 125 in digital locker 120a is not marked as lent and lender 105 is informed. In step 430, if lending offer email 114 is emailed successfully, lending server 150 marks digital content 125 in digital locker 120a as lent in step 440. Lender 105 cannot download, lend, or otherwise use digital content 125 while digital content 125 is lent.

A record in lending offers database 225 for lending offer 110 is created with an associated lending offer ID. In a preferred embodiment, lendee 109 must accept lending offer 110 within a specified period of time, which CGI software 205 checks and enforces. If lendee 109 does not accept lending offer 110 within a specified period of time, CGI software 205 expires lending offer 110 and the lent identification on digital content 125 in digital locker 120a is removed. When digital content 125 no longer has a lent indication, lender 105 may use digital content 125 again. In step 435, if lending offer email 114 is not emailed successfully, digital content 125 in lender's 105 digital locker 120a is not marked as lent and lender 105 is informed in step that the lending offer 110 was not successfully sent.

Figure 5:
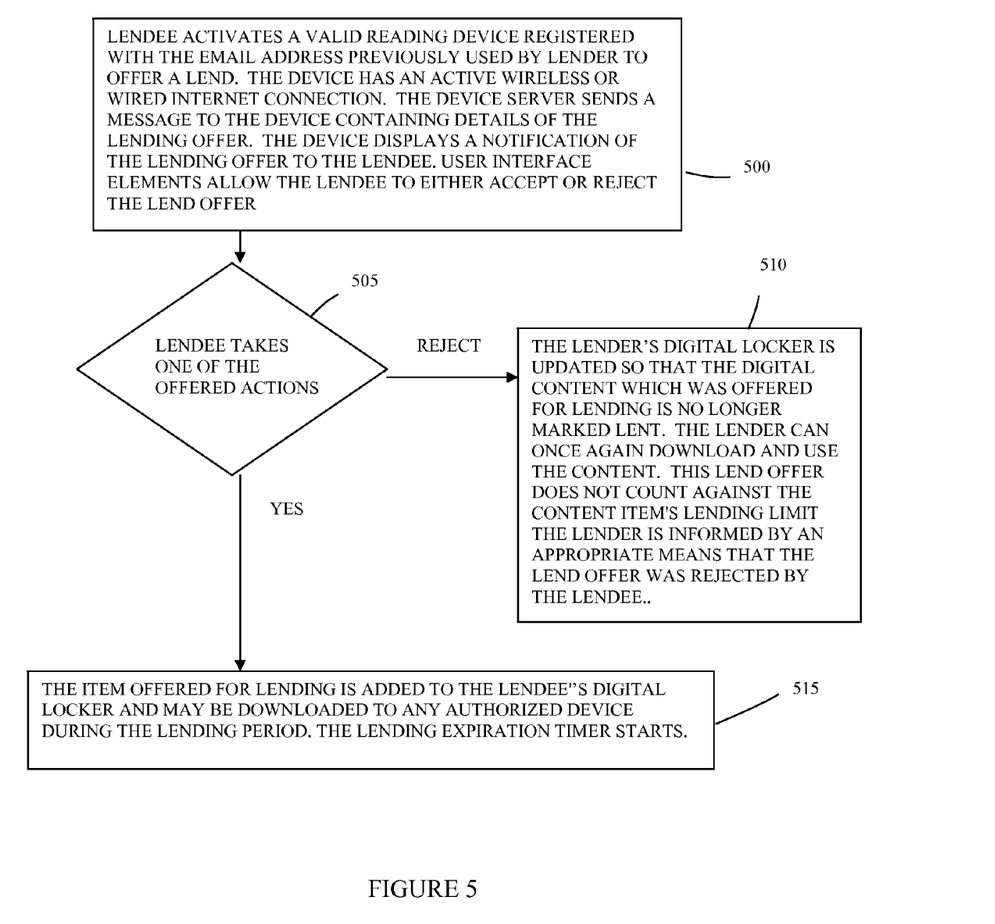
FIG. 5 illustrates a flowchart of a method for a consumer-to-consumer lending process where a lendee receives a content lending offer via device notification and acts upon the lending offer.

FIG. 5 shows an exemplary method for receiving a lending offer 110 from a mobile device, where lendee 109 receives lending offer notification 113 to accept or reject lend offer 110 on her local device 130b. Lendee 109 previously registered local device 130b with lending server 150, providing her email address 111 to the server 150. In step 500, lendee 109 engages with local device 130b while having an active wireless or wired Internet connection. As described above in connection with FIGS. 3 and 4, lending server 150 sends details of lending offer 110 to lendee's 109 local device 130b in the form of a lending offer notification 113. When lendee's 109 local device 130b receives lending offer 110, lending offer notification 113 is displayed on local device 130b. Lendee 109 invokes device lending interface to view details of lending offer 110 and to accept or reject lending offer 110.

In step 510, if lendee 109 rejects lending offer 110, lending server 150 updates digital content 125 in lender's 105 digital locker 120a to indicate that digital content 125 has not been lent. When digital content 125 no longer has a lent indication, lender 105 may once again use digital content 125. In one embodiment of the invention, there is a limit on the number of times a lender 105 can lend a particular digital content 125. In this embodiment, a rejected lending offer 110 does not count against the lending limit associated with digital content 125. Lender 105 is informed by an appropriate means (e.g., an email or other electronic notification) that lendee 109 rejected lending offer 110. In step 515, if lendee 109 accepts lending offer 110, lending server 150 adds digital content 125 to lendee's 109 digital locker 120b. Once lending offer 110 is accepted and digital content 125 is available in lendee's 109 digital locker 120b, the expiration timer for the lending period of digital content 125 starts. In a preferred embodiment, the lending period is 14 days, but this pending period can be adjusted without limitation in the system and method of the present invention. Publishers and owners of the digital content 125 will typically dictate the maximum lending period allowed for digital content 125. Lendee 109 may download and use digital content 125 during the lending period on any of her authorized local devices 130b.

After the lending period has expired, the digital content 125 is removed from the lendee's digital locker 120b and lendee 109 is thereafter not permitted access to the digital content 125. Simultaneously, the indication in lender's 105 digital locker 120a that digital content has been lent is removed and lender 105 is once again provided full access to the digital content 125 that had been lent.

In a preferred embodiment of the present invention, a copy of the digital content 125 to be loaned is stored on the lender's local device 130a. In this embodiment, the local device 130b periodically performs a synchronization process with the lending server 150. During the synchronization, the lending server 150 takes any action necessary with respect to the local copy of the digital content item 125 stored on the lender's local device 130, as indicated by the status of the digital content item 125 contained in the lender's digital locker 120a. For example, after the lender 105 has sent a lending offer 110 with respect to a particular item of digital content 125, the status of the item 125 in the lender's digital locker 120a is indicate as on HOLD, pending the acceptance or rejection of the lending offer 110 by the lendee 109. While the item is marked as being on HOLD, the lender 105 is prevented from accessing the copy of the digital content item 125 on her local device 130a. To prevent the lender's 105 access to the item 125, the server 150 sets the appropriate flags associated with the copy of the item 125 on the local device 130a. Similarly, once the item is lent, the server 150 prevents the lender 105 from accessing the local copy on device 130a. Alternatively, the server 150 can actively remove the copy of the item 125 from the lender's local device 103a during the HOLD or lending period.

Similar to the operation in regard to the lender's local device 130a, the server also controls the access to item 125 on the lendee's local device 130b. For example, when a lendee 109 accepts a loan offer 110, the server downloads a copy of the loaned content 125 to the lendee's local device 130b. In a preferred embodiment, the content 125 is encrypted before it is sent from the server 150 to the lendee's local device 130b, and decrypted for reading by the local device 130b. During the lending period, the loaned item 125 is marked both in the lendee's digital locker 120b and on the local device 130b as being borrowed. After the expiration of the lending period (or when returned or purchased by the lendee 109), when the lendee's local device 130b synchronizes with the server 150, the server 150 removes the borrowed copy of the item 150 from the lendee's local device 130b.

Figure 6A:
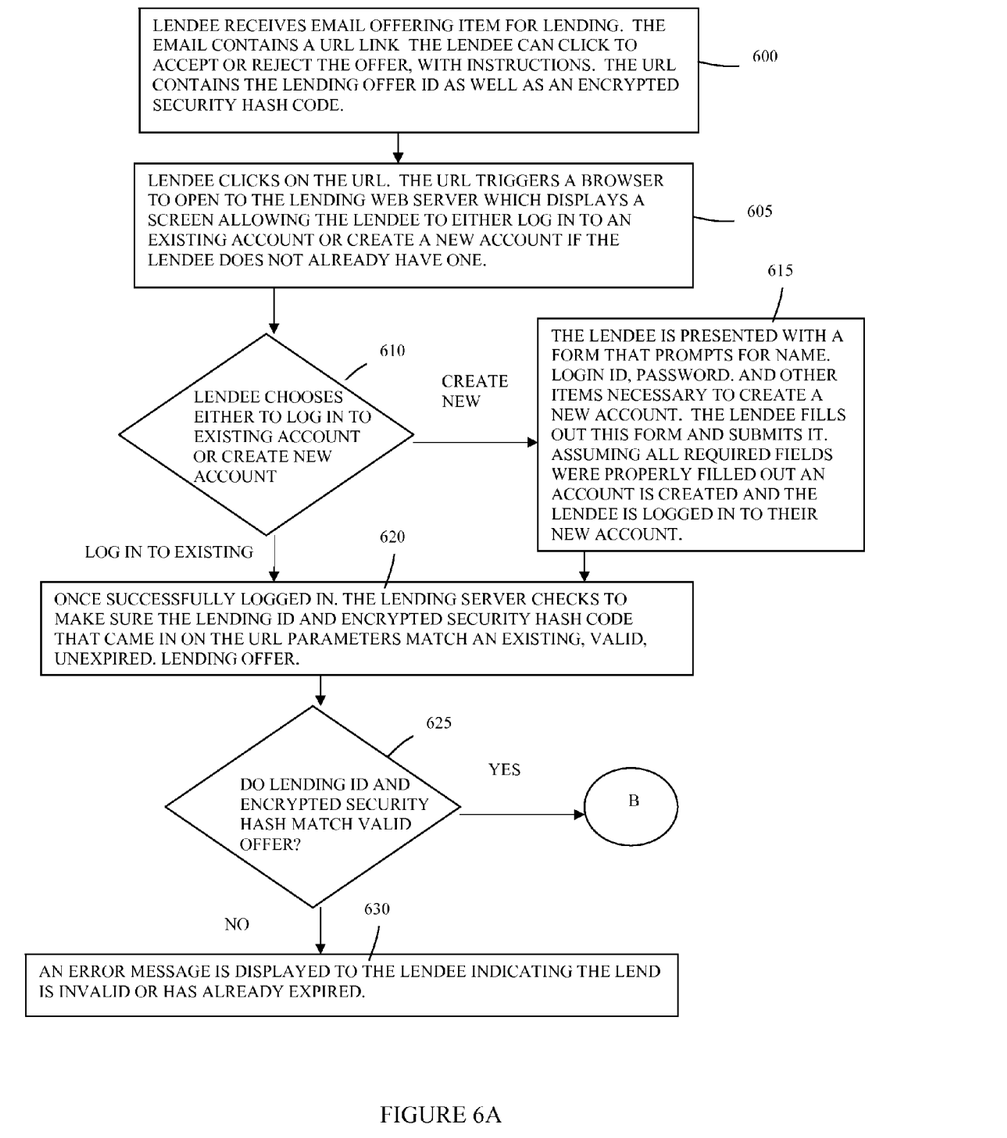
FIGS. 6A and 6B contain a flowchart of an exemplary embodiment of a method for a consumer-to-consumer lending process where a lendee receives a content lending offer via email notification and acts upon the lending offer.
Figure 6B:
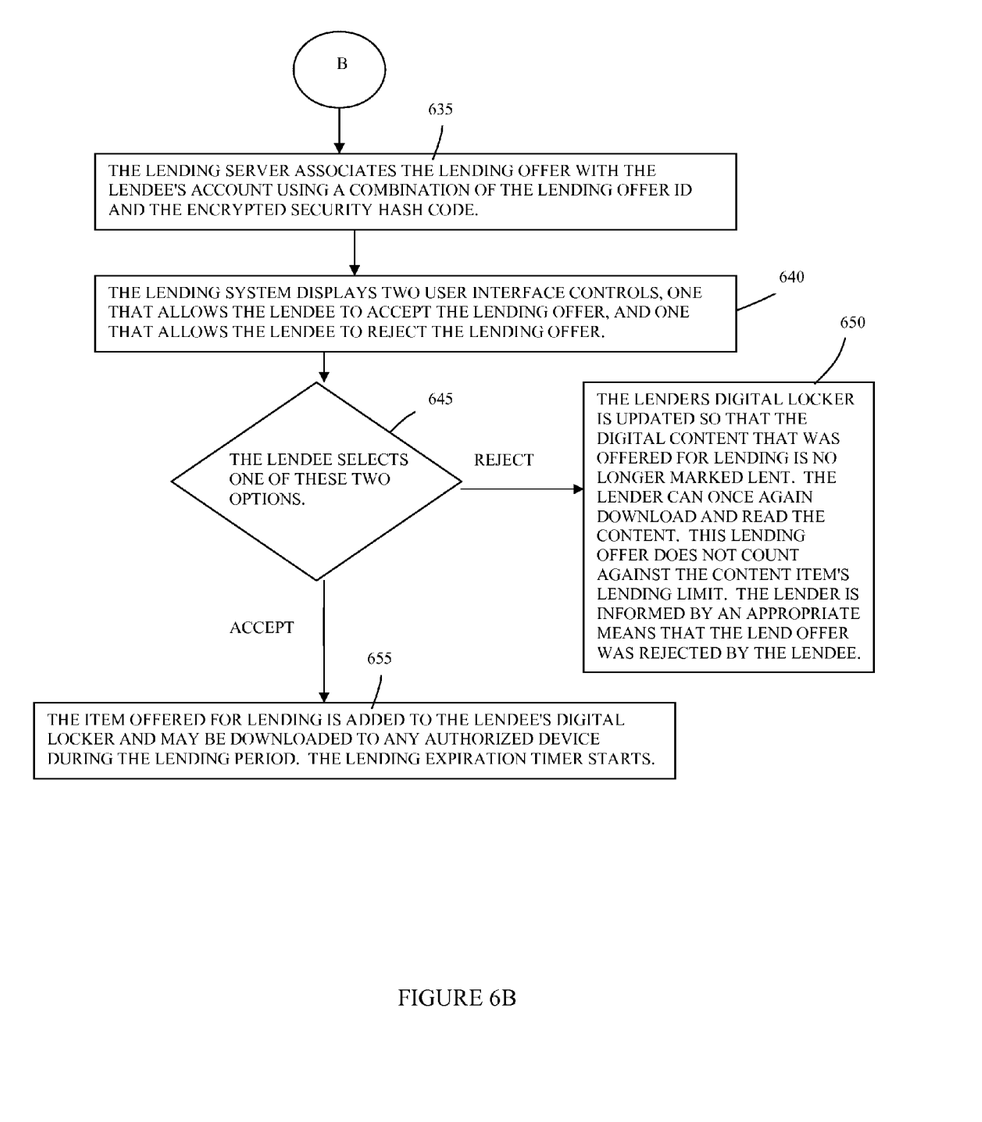

FIGS. 6A and 6B show an exemplary web enabled method for accepting or rejecting a lending offer 110. In step 600, lendee 109 receives a lending offer 110 via email. In this embodiment, a lending offer email 114 is delivered to email address 111 of lendee 109 that was provided by lender 105. Lending offer email 114 contains instructions and a lending offer URL, which is a link that the email address 111 recipient can click to start the process for accepting or rejecting the lending offer 110. Lending offer URL contains a lending offer ID and encrypted security hash code parameters. In step 605, when the email address 111 recipient has an active Internet connection and clicks lending offer URL, a web browser is opened with web account interface. In step 610 it is determined if the recipient is already an authorized user of the system (i.e., has an account with lending server 150). If the email address 111 recipient is not an authorized user with an existing account, the email recipient in step 615 is prompted to create a new account. Once a new account is created, the email recipient can use web account interface to log in to the new account and continue with the lending process. If the email recipient is a current authorized user, i.e., a lendee 109, lendee 109 can use web account interface to log in to her account. In step 620, once lendee 109 is logged in successfully, lending server 150 checks to make sure the lending offer ID and encrypted security hash code that came with the URL parameters match those for an existing, valid, unexpired lending offer 110.

In step 630, if the lending offer ID and encrypted security hash code do not match a valid lending offer 110, an error message is displayed to lendee 109 indicating that lending offer 110 is invalid or expired. If the lending offer ID and encrypted security hash code match a valid lending offer 110, lending server 150 in step 635 associates lending offer 110 with lendee's 109 account. This association is made using a combination of the lending offer ID and encrypted security hash code. Once lending offer 110 is associated with lendee's 109 account, lendee 109 is presented with web lending interface in step 640 to accept or reject lending offer 110. If lendee 109 rejects lending offer 110, lending server 150 processes the rejection in a manner similar to the method illustrated in FIG. 5 as shown in step 650. If lendee 109 accepts lending offer 110, lending server 150 processes the acceptance in a manner similar to method illustrated in FIG. 5 as shown in step 655.

Lendee 109 may use device lending interface or web lending interface to return or purchase lent digital content 125 before its lending period expires (not shown in Figures). When digital content 125 is returned or purchased before its lending period expires, or when its lending period expires, lending server 150 updates the identification with respect to digital content 125 in lender's 105 digital locker 120a to identify that the previously lent digital content 125 as not lent.

Figure 7:
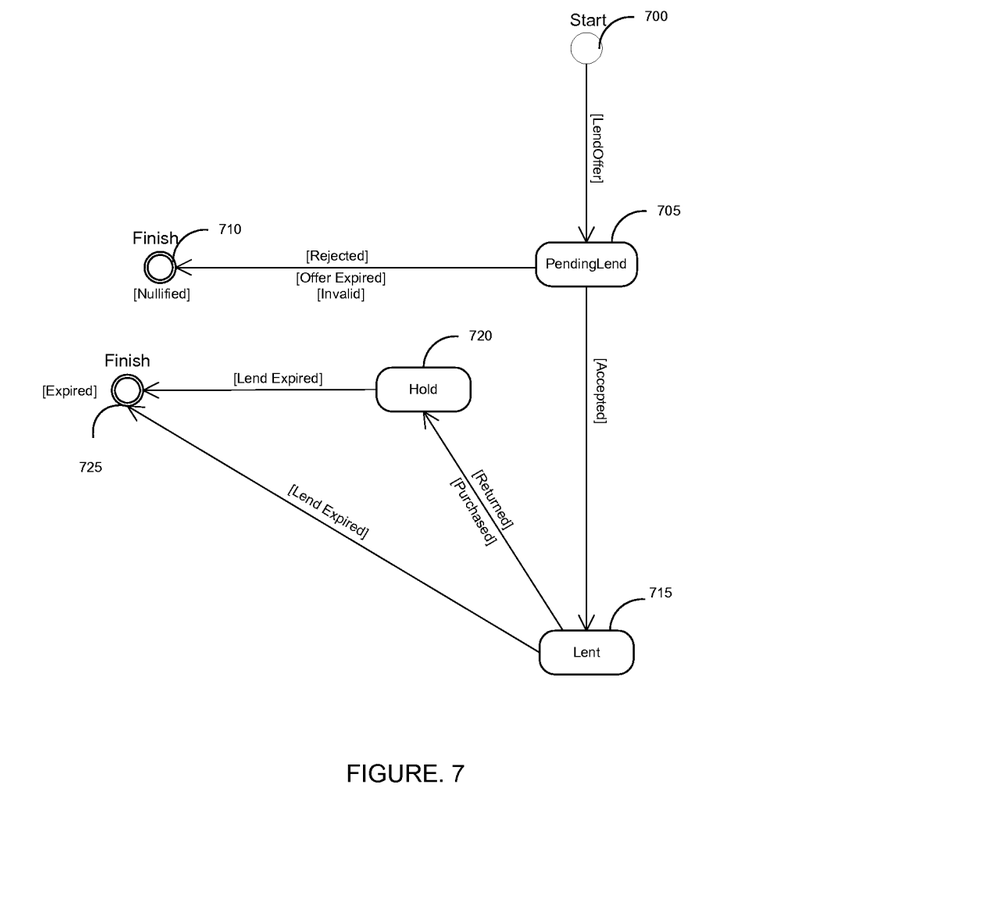
FIG. 7 illustrates a state diagram for an item of digital content during the lending process.

FIG. 7 illustrates a state diagram explaining the status of an item of digital content 125 during the lending process. At the start of the process 700, an offer 110 by lender 105 has not been made. Once the offer 110 is made, the state of the digital content 125 in lender's digital locker 120a changes to PEND- ING_LEND 705. Once the offer 110 has been received by lendee 109, the status of the digital content in lendee's digital locker 120*b* is PENDING_BORROW to indicate that the lendee 109 has a outstanding lending offer 110 that he or she can accept, reject or ignore. In an additional aspect, once the lendee 109 has viewed but not acted on the offer 110, the status of the item in lendee's locker 120*b* changes to PENDING_VIEWED.

If the lendee 109 rejects the offer 110, if the offer 110 expires, or if the offer is invalid, the state of the digital content 125 in the lender's locker 120*a* and the lendee's locker 120*b* is marked as nullified 710. If lendee 109 accepts the offer 110, the status of the loaned digital content 125 in lender's locker 120*a* changes to LENT 715. As described above, if the status of an item is lent, lender 105 is prevented from accessing the lent digital content 125. In the lendee's digital locker 102*b*, the status of the item 125 is changed to BORROWED.

After a loaned item has been returned or purchased by lendee 109, but before the expiration of the lending period as described above, the item is marked in lender's locker 120*a* as LENDER_HOLD 720. At the same time, the item 125 in lendee's digital locker 120*b* is marked as RETURNED. At the end of the lending period (expiration) the status of the item 125 is marked as EXPIRED 725 in lendee's locker 120*b*, and is again available for lending by the lender 105, assuming further lending is permitted by the rules for lending associated with the digital content 125 (e.g., some content can only be lent once, some content can only be lent once during a particular time period . . . ).

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method for lending a digital content item from a lender to a lendee comprising:
  receiving, at a lending server, a lending offer from the lender of the digital content item, the lending offer identifying at least the digital content item to be loaned and identifying the lendee, the lending server associating the lending offer with a lending offer ID;
  generating, by the lending server, a lending notice identifying at least the digital content item, wherein the lending notice comprises an email, the email including a Uniform Resource Locator (URL) by which the lendee can connect to the lending server, wherein the URL contains parameters including a combination of the lending offer ID and an encrypted security hash code;
  transmitting, by the lending server, the email to the lendee;
  preventing access by the lender to the digital content item after the lending notice has been transmitted;
  receiving, at a lending server, an acceptance or rejection of the lending offer from lendee;
  verifying, by the lending server, that the parameters contained in the URL used by the lendee matches an existing, valid, unexpired lending offer; and
  if the lendee has accepted the lending offer, the lending server providing the lendee with access to the digital content item and preventing access by the lender to the digital content item.

2. The method according to claim 1, further comprising: providing a browser-based interface for the lender and the lendee to interface with the lending server.

3. The method according to claim 1, wherein the act of generating and transmitting the lending notice further comprises providing notice to the lendee on an electronic device of the lendee that is not registered with the lending server.

4. The method according to claim 1, wherein a copy of the digital content item is stored on an electronic device of the lender, the act of preventing access by the lender to the digital content item further comprising:
  removing the digital content item from the lender's electronic device.

5. The method according to claim 1, wherein each of the lender and the lendee have electronic devices by which they access the lending server, the method further comprising:
  synchronizing the electronic devices with the lending server.

6. The method according to claim 1, wherein the act of providing the lendee with access to the digital content item further comprises transmitting a copy of the digital content item from the server to an electronic device of the lendee.

7. The method according to claim 6, further comprising encrypting the copy of the digital content item before it is transmitted from the server to the electronic device of the lendee.

8. The method according to claim 1, further comprising:
  setting an expiration period for the lending notice during which the lendee must accept the lending offer.

9. The method according to claim 1, further comprising:
  setting a loan period for the loan of the digital content item; and
  after the expiration of the loan period, the lending server preventing access by the lendee to the digital content item and granting access to the digital content item by the lender.

10. The method according to claim 1, further comprising:
  setting a predetermined numbers of times that a lender can loan the digital content item.

11. The method according to claim 1, further comprising:
  providing an interface for the lender to view a plurality of digital content items to which the lender has access.

12. The method according to claim 11, further comprising:
  providing an identification of which of the plurality of digital content items are capable of being loaned.

13. A system for controlling the lending of a digital content item from a lender to a lendee comprising:
  a lending server operable to:
  receive a lending offer from the lender of the digital content item, the lending offer identifying at least the digital content item to be loaned and identifying the lendee, the lending server associating the lending offer with a lending offer ID,
  generate a lending notice identifying at least the digital content item, wherein the lending notice comprises an email, the email including a Uniform Resource Locator (URL) by which the lendee can connect to the lending server, wherein the URL contains parameters including a combination of the lending offer ID and an encrypted security hash code,
  transmit the email to the lendee,
  prevent access by the lender to the digital content item after the lending notice has been transmitted,
  receive an acceptance or rejection of the lending offer from lendee,
  verify that the parameters contained in the URL used by the lendee matches an existing, valid, unexpired lending offer, and
  if the lendee has accepted the lending offer, provide the lendee with access to the digital content item and prevent access by the lender to the digital content item.

14. The system according to claim 13, wherein the lending server further comprises:
- a customer account database storing information related to accounts of the lender and lendee with the lending server;
- a lending offer database storing information related to the lending offer including the acceptance or rejection of the lending offer; and
- a digital locker database storing information related to the digital content item.

15. The system according to claim 14, wherein the lending server further comprises:
- customer data software coupled to the customer account database, the lending offer database and the digital locker database, the customer data software is operable to:
- validate the lending offer,
- create the lending notice, and
- mark the digital content item as lent in a lender's digital locker in the digital locker database.

16. The system according to claim 13, where in the lending server further comprises:
- a digital content file database storing the digital content item, and
- content control software, the content control software operable to encrypt the digital content item.

17. A system for controlling the lending of a digital content item from a lender to a lendee comprising:
- a computer server;
- a user interface operable on the computer server, the user interface communicating with the lender and the lendee, the user interface receive a lending offer from the lender of the digital content item, the lending offer identifying at least the digital content item to be loaned and identifying the lendee;
- a customer account database stored on the computer server, the customer account database storing information related to accounts of the lender and lendee with the system;
- a lending offer database stored on the computer server, the lending offer database storing information related to the lending offer, the lending offer being associated with a lending offer ID in the lending offer database;
- a digital locker database stored on the computer server, the digital locker database storing information related to the digital content item;
- customer data software operable on the computer server, the customer data software coupled to the customer account database, the lending offer database and the digital locker database, the customer data software being operable to validate the lending offer, create a lending notice to the lendee, and mark the digital content item as lent in a lender's digital locker in the digital locker database, wherein the lending notice comprises an email, the email including a Uniform Resource Locator (URL) by which the lendee can connect to the lending server, wherein the URL contains parameters including a combination of the lending offer ID and an encrypted security hash code, wherein the customer data software is further operable to prevent access by the lender to the digital content item after the lending notice has been transmitted, and wherein the customer data software is further operable to verify that the parameters contained in the URL used by the lendee matches an existing, valid, unexpired lending offer;
- a digital content file database stored on the computer server, the digital content file database storing the digital content item, and
- content control software operable on the computer server, the content control software coupled to the digital content file database, the content control software operable to encrypt the digital content item.

18. A system for lending a digital content item from a lender to a lendee comprising:
- a lender electronic device, the lender electronic device generating a lending offer identifying at least the digital content item to be loaned and identifying the lendee;
- a lending server, the lending server:
  - receiving the lending offer from the lender, the lending server associating the lending offer with a lending offer ID,
  - generating a lending notice identifying at least the digital content item to be loaned, wherein the lending notice comprises an email, the email including a Uniform Resource Locator (URL) by which the lendee can connect to the lending server, wherein the URL contains parameters including a combination of the lending offer ID and an encrypted security hash code,
  - transmitting the lending notice to the lendee,
  - preventing access by the lender to the digital content item after the lending notice has been transmitted; and
- a lendee electronic device, the lendee electronic receiving the lending offer, generating an acceptance or rejection of the lending offer and transmitting the acceptance or rejection to the lending server from lendee,
- wherein if the lendee has accepted the lending offer, the lending server:
  - verifies that the parameters contained in the URL used by the lendee matches an existing, valid, unexpired lending offer, and
  - provides the lendee with access to the digital content item and prevents access by the lender to the digital content item.

* * * * *